United States Patent
Stevens et al.

(10) Patent No.: US 6,604,711 B1
(45) Date of Patent: Aug. 12, 2003

(54) AUTONOMOUS SYSTEM FOR THE AERIAL REFUELING OR DECONTAMINATION OF UNMANNED AIRBORNE VEHICLES

(75) Inventors: Paul Stevens, Chino, CA (US); Sach Sinha, Burbank, CA (US)

(73) Assignee: Sargent Fletcher, Inc., El Monte, CA (US)

( * ) Notice: Subject to any disclaimer, the term of this patent is extended or adjusted under 35 U.S.C. 154(b) by 290 days.

(21) Appl. No.: 09/716,099

(22) Filed: Nov. 20, 2000

(Under 37 CFR 1.47)

(51) Int. Cl.[7] .............................................. B64D 37/00
(52) U.S. Cl. ................................................. 244/135 A
(58) Field of Search ................. 244/115, 116, 244/161, 135 R, 135 A, 152

(56) References Cited

U.S. PATENT DOCUMENTS

| | | | |
|---|---|---|---|
| 2,507,069 A | | 5/1950 | Vincent |
| 2,946,543 A | * | 7/1960 | Gordon et al. .............. 244/113 |
| 2,954,190 A | | 9/1960 | Le Clair |
| 2,995,321 A | | 8/1961 | Zeitler |
| 3,048,357 A | * | 8/1962 | Loedding ................. 244/135 A |
| 3,061,246 A | | 10/1962 | Kirby |
| 3,674,049 A | | 7/1972 | MacGregor |
| 4,025,193 A | * | 5/1977 | Pond et al. .............. 244/135 A |
| 4,095,761 A | | 6/1978 | Anderson et al. |
| 4,511,105 A | | 4/1985 | Morrisey |
| 4,540,144 A | | 9/1985 | Perrella |
| 4,586,683 A | | 5/1986 | Kerker |
| 4,633,376 A | | 12/1986 | Newman |
| 4,790,497 A | * | 12/1988 | Yoffe ...................... 244/110 F |
| 4,796,838 A | * | 1/1989 | Yamamoto .............. 244/135 A |
| 4,834,531 A | * | 5/1989 | Ward .......................... 244/161 |
| 5,326,052 A | * | 7/1994 | Krispin et al. .......... 244/135 A |
| 5,499,784 A | * | 3/1996 | Crabere et al. ......... 244/135 A |
| 5,530,650 A | * | 6/1996 | Biferno et al. .......... 244/135 A |
| 5,906,336 A | * | 5/1999 | Eckstein ................. 244/135 A |
| 6,324,295 B1 | * | 11/2001 | Valery et al. ................ 382/100 |

FOREIGN PATENT DOCUMENTS

GB 740334 11/1955

\* cited by examiner

*Primary Examiner*—Peter M. Poon
*Assistant Examiner*—Kevin Jakel
(74) *Attorney, Agent, or Firm*—Edward A. Sokolski

(57) ABSTRACT

A motor with a variable speed controller is used to operate a hose reel for connecting a fuel source or decontaminant on a tanker plane to a fuel tank or other receptor on an unmanned vehicle. The hose reel is controlled to feed the fuel or other liquid through the hose and a drogue to a receiving probe on the unmanned vehicle and is also controlled to maintain the drogue in proper position. This end result is achieved by means of a controlling transponder on the unmanned vehicle which receives radio control signals from a communicating transponder on the tanker. A microcomputer processes the received control signals which are then fed to the motor controller. The motor controller not only controls the positioning of the drogue but also controls the motor so that excess hose is reeled in by the hose reel. The controller in addition controls the thrust power. A lidar tracker with a miniature video camera maintains a line of sight between the drogue and the receiver probe and tracks the drogue-probe.

8 Claims, 5 Drawing Sheets

AUTONOMOUS SYSTEM FOR THE AERIAL REFUELING OR DECONTAMINATION OF UNMANNED AIRBORNE VEHICLES

BACKGROUND OF THE INVENTION

1. Field of the Invention

This invention relates to the aerial refueling of unmanned vehicles and more particularly to a system for such aerial refueling which is completely automated.

2. Description of the Related Art

The use of unmanned air vehicles for combat related missions as well as reconnaissance missions is extensively employed by the military. Effective refueling systems, however, for unmanned aircraft are not known to be available.

Aerial refueling systems are used extensively to extend the range of manned vehicles. Such systems generally employ either what is known as the flying boom or the hose and drogue. With the flying boom, a fueling boom is lowered and extended from the aft fuselage of the tanker aircraft by a boom operator. The boom operator then steers the boom into the fuel receptacle of the aircraft to be refueled. In the hose-and-drogue system, a paradrogue attached to a hose is generally employed. The hose is wrapped around a drum or hose reel and deployed by the tanker aircraft crew by means of a hose reel drive mechanism. This drive mechanism is powered independently by the tanker aircraft power supply or by means of a ram air turbine. The aircraft being refueled has either a fixed or retractable probe and the pilot of this aircraft flies the probe into the drogue. Hose-and-drogue systems can be deployed from the aircraft fuselage or from pods mounted on the fuselage.

Hose-and drogue systems have advantages over flying boom systems in that they can service several aircraft simultaneously from units installed in wing mounted pods as well as fuselage mounted hoses. The flying boom, on the other hand can only service one aircraft at a time. Also the hogue-and-drogue systems can refuel both fixed wing and rotary wing aircraft while the flying boom can only service fixed wing aircraft.

Refueling systems of the prior art are not suitable for refueling unmanned aircraft and certainly not suitable for refueling from an unmanned tanker aircraft. The system of the present invention is an improvement over the prior art in that it provides an automatic aerial refueling system capable of refueling unmanned air vehicles from either manned or unmanned tanker aircraft.

SUMMARY OF THE INVENTION

The system of the present invention uses a DC motor with a variable speed controller or a controlled hydraulic drive system for driving a hose reel around which the hose through which fuel is fed to the drogue is wound. The controller for the hose reel incorporates a radio transponder and antenna. The aircraft to be fueled has a similar transponder and antenna. The tanker transponder initiates communications with the transponder of the aircraft to be refueled to provide control signals which are employed to reduce the relative motion between the two aircraft. A lidar tracker with a miniature video camera maintains a line of sight between the tanker drogue and the probe of the aircraft to be refueled. In this manner, the drogue and probe are brought into contact with each other and maintained in such contact.

Drogue motion resulting from aerodynamic forces and the structural response of the hose is controlled either by a lifting surface control system mounted on the paradrogue base and deployed by means of powered actuators or a thrust vector control system consisting of multiple thrust nozzles mounted radially on the drogue base which are powered by a suitable power source.

It is therefore an object of this invention to provide an improved aerial fueling system which can be employed with unmanned aircraft.

It is a further object of this invention to enable the fueling of an unmanned aircraft by an unmanned tanker.

Other objects of the invention will become apparent in view of the following description taken in connection with the accompanying drawings.

DESCRIPTION OF THE DRAWINGS

FIG. 2A is a view taken along the plane indicated by 2A—2A in FIG. 2;

FIG. 2B is a front elevational view of the thruster head of the device of the invention;

FIG. 2C is a side elevational view of one of the lenses and filters of the device of the invention;

FIG. 3A is a view taken along the plane indicated by 3A—3A in FIG. 3;

FIG. 3B is a side elevational view of the drogue used in the system of the invention.

FIG. 4A is a view taken along the plane indicated by 4A—4A in FIG. 4;

FIG. 4B is an enlarged side elevational view of the drogue of the embodiment of FIG. 4.

DETAILED DESCRIPTION OF THE INVENTION

Figure 1:
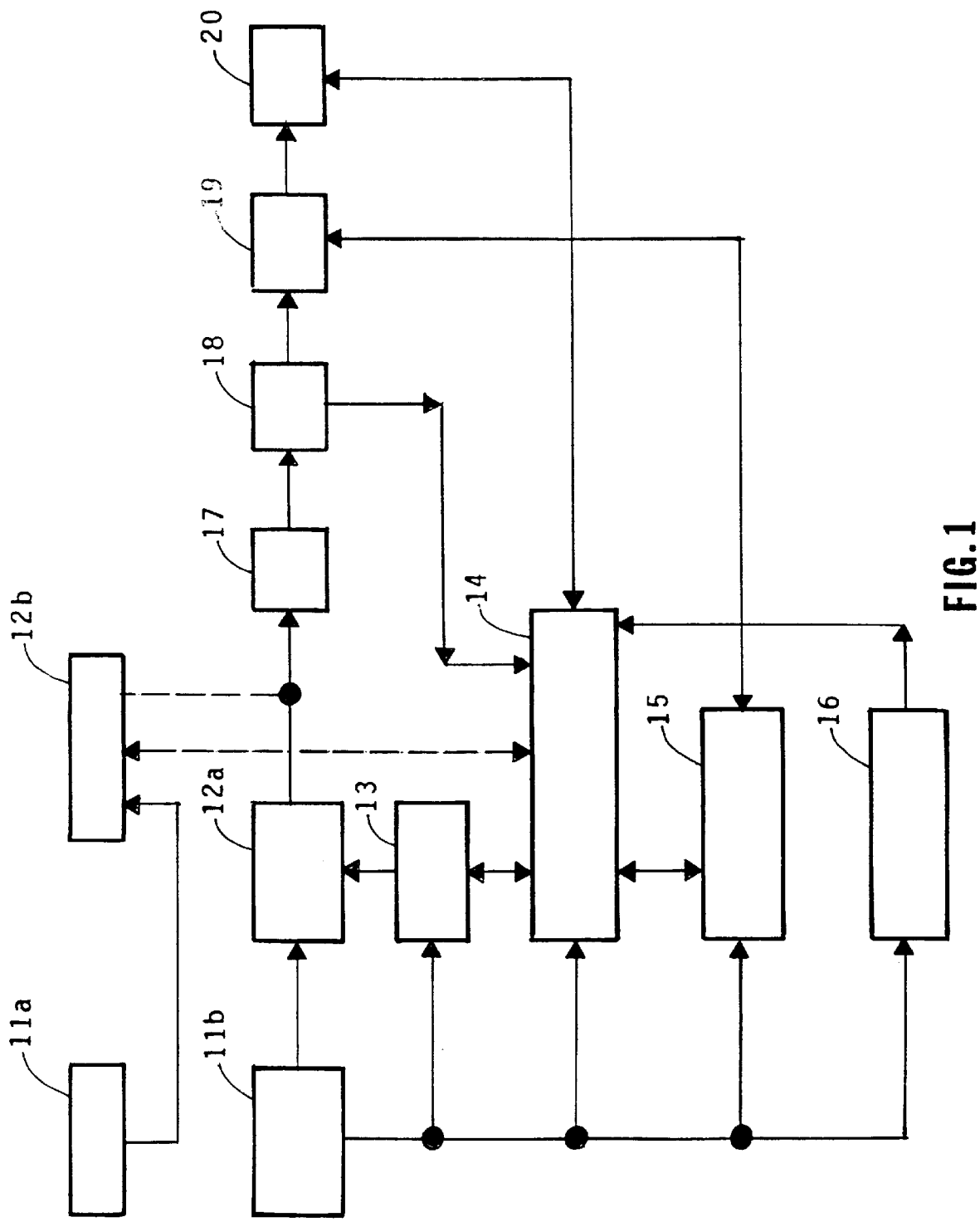
FIG. 1 is a functional block diagram illustrating the basic features of the system of the invention.

Referring to FIG. 1, a functional block diagram of the basic features of the invention is shown.

The deployment of the hose and drogue into the air stream is achieved by means of a hose reel 17 powered by a variable speed electric motor 12a in turn powered by DC power supply 11b. In lieu of the electric motor, an hydraulic motor and servo system 12b powered by wind turbine power generator 11a may be employed. The wind turbine power generator may receive its power from an alternator incorporated therein or a battery which may be part of the DC power supply 11b. The connections of the hydraulic motor drive to the system are shown with dotted lines for convenience of illustration. The hydraulic motor may be similar to that employed in Aerial Refueling(AR) systems currently being manufactured for manned aerial refueling systems by Sargent Fletcher, Inc. El Monte, Calif., the assignee of the present invention.

Motor controller 13 has an electronic servo system and interfaces with microcomputer 14. Hose tension sensor 18 senses the tension on the hose reel 17 and provides a signal to microcomputer 14 which in turn provides a control signal to motor controller 13. In response to this control signal, the motor controller controls the motor 12a so that excess hose is reeled in by the hose reel upon engagement of the drogue canopy 25(See FIG. 2) with the aircraft being refueled.

Transponder and GPS antenna 16 monitors the distance between the tanker and the aircraft being refueled. When the transponder confirms that the two aircraft are flying in proper formation for fueling, it signals the microcomputer 14 which in turn causes the motor controller 13 to turn on the hose reel motor 12a(or 12b). Lidar 20 determines the distance and relative orientation between the drogue and the probe(See FIG. 2) and sends a signal to the microcomputer which in turn provides a control signal to thruster control 15 which controls the thrusters 19.

Figure 4:
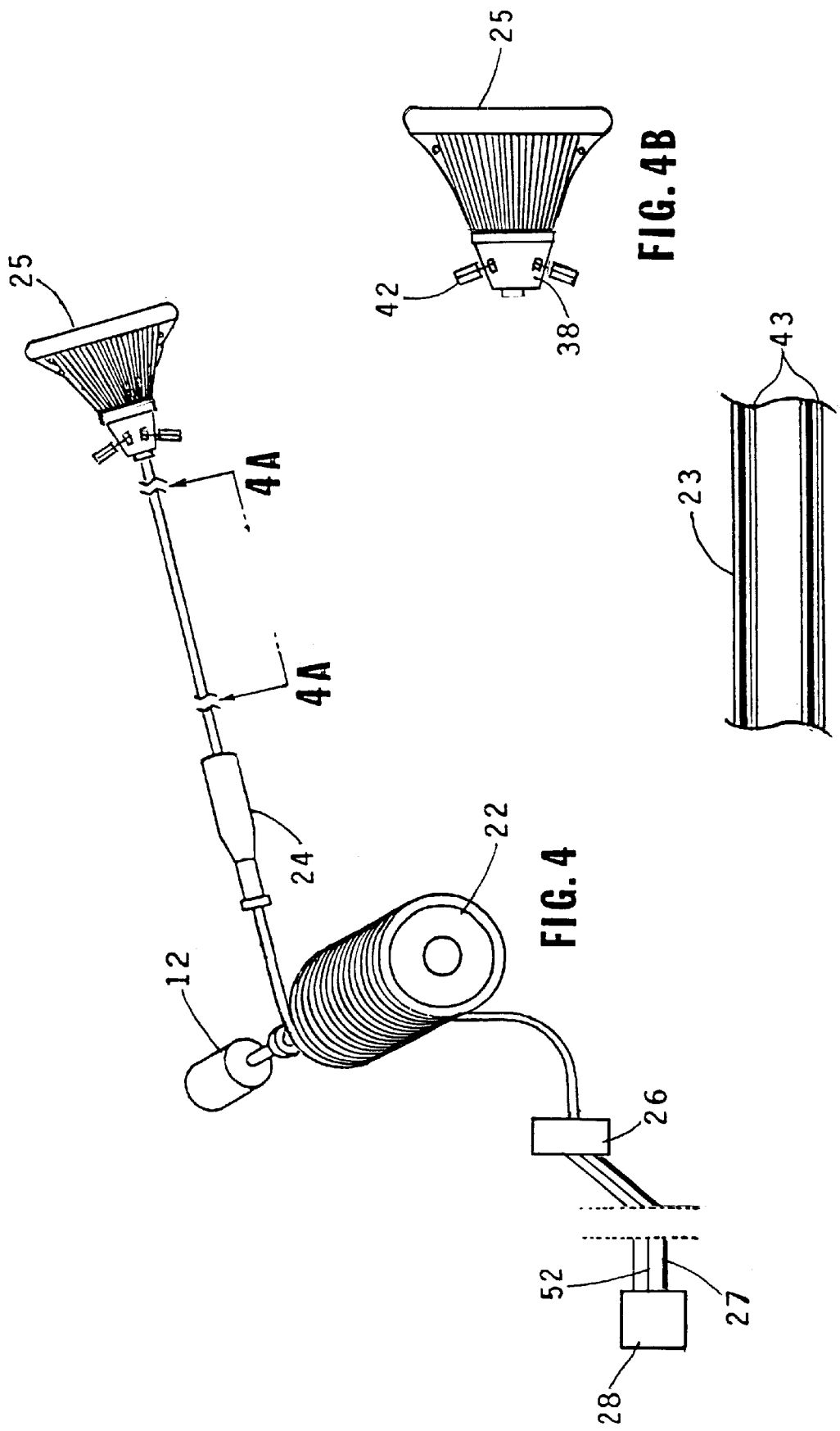
FIG. 4 is a schematic drawing illustrating an aerodynamic drogue motion control of the device of the invention involving the lifting of surfaces.
Figure 5:
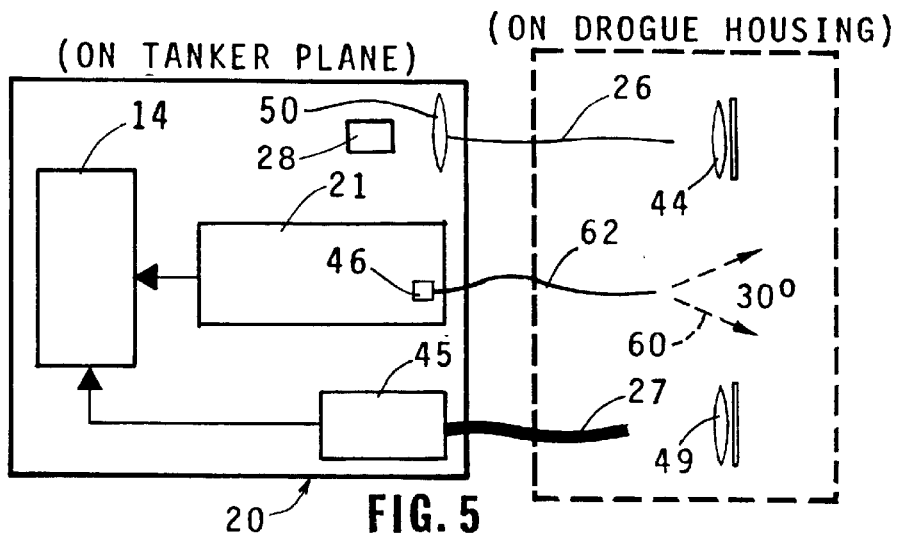
FIG. 5 is a schematic diagram illustrating the drogue motion tracker employed in the system of the invention.

Referring now to FIG. 5, the lidar tracker 20 employed in the system of the invention is illustrated. A pulsed laser beam from a short pulse laser diode 46 installed in unit 21 along with its associated electronics is transmitted via optical fiber 62 and an associated lens(not shown) and illuminates a divergent cone 60 of about 30 degrees. This forms the "lidar transmitter." When the probe is within the engagement cone or canopy 25(See FIGS. 3 and 4), laser radiation reflected from the beam is passed through lens 44 optical fiber 26 and lens 50 to photo diode 28 which forms the "lidar receiver." The lidar transmitter and receiver operate to rapidly update the range between the probe and the receptacle of the aircraft being fueled. The reflected beam also passes through lens 49 and fiber bundle 27 to mini video camera and digitizer 45.

The signal received by photo diode 28 calculates distance to the probe receptor on the aircraft to be refueled while the video camera and digitizer calculates angle. The video camera is able to distinguish the refueling probe from the background image of the aircraft being refueled by means of a pattern recognition algorithm in its digitizer. The video camera is also used to guide the refueling probe into the drogue until engagement occurs and reception coupling is achieved. The signal received by the lidar receiver which comprises photo diode 28 and the digitized signal output of video camera and digitizer 45 are fed to computer 14 which generates a control signal for controlling the drogue motion controller. The video camera 45 and its digitizer uses a real-time algorithm employing image thresholding and laser-spot centroid calculation.

Figure 2:
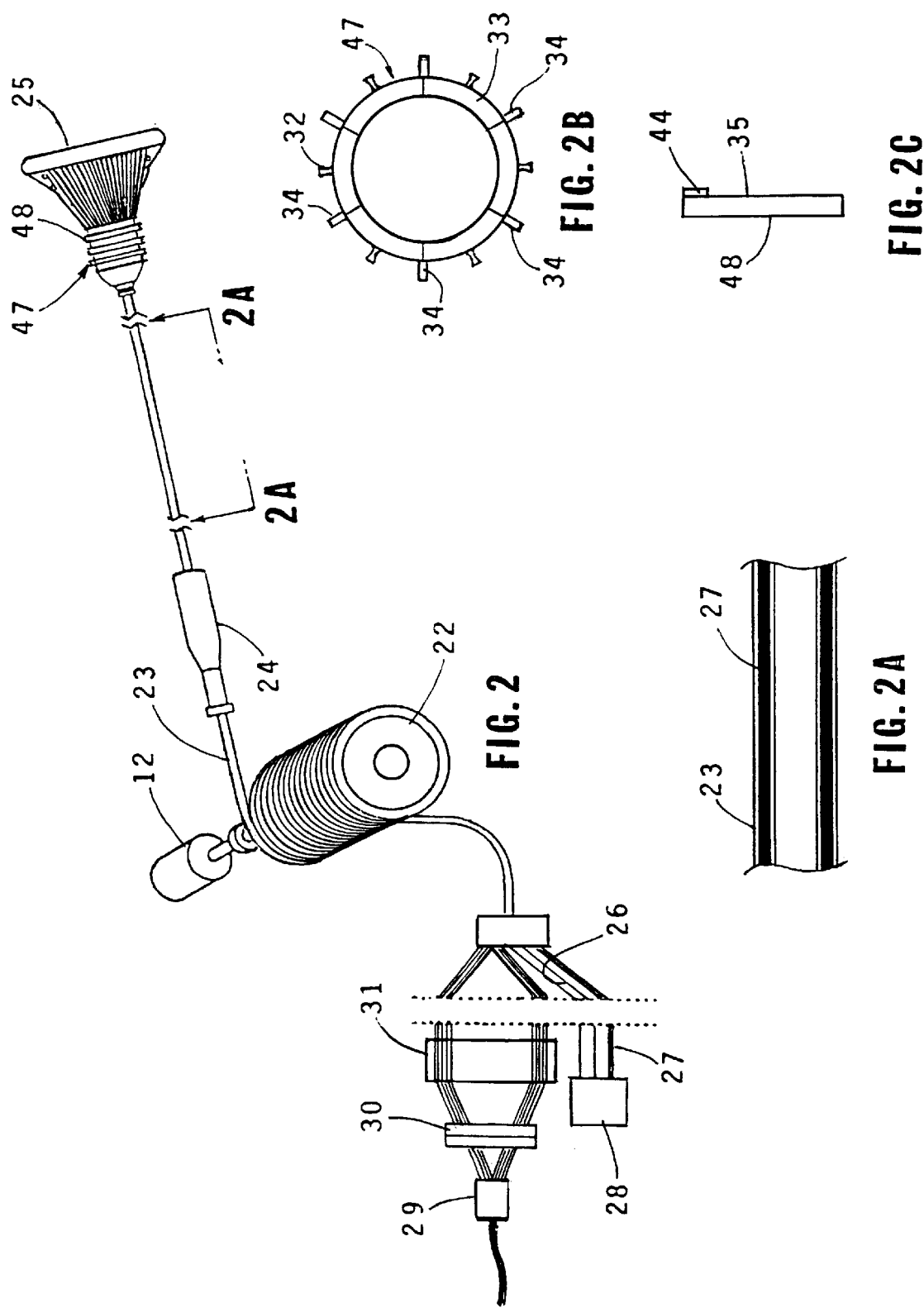
FIG. 2 is a schematic drawing illustrating the use of hot gas for propelling the drogue used in the system of the invention.
Figure 3:
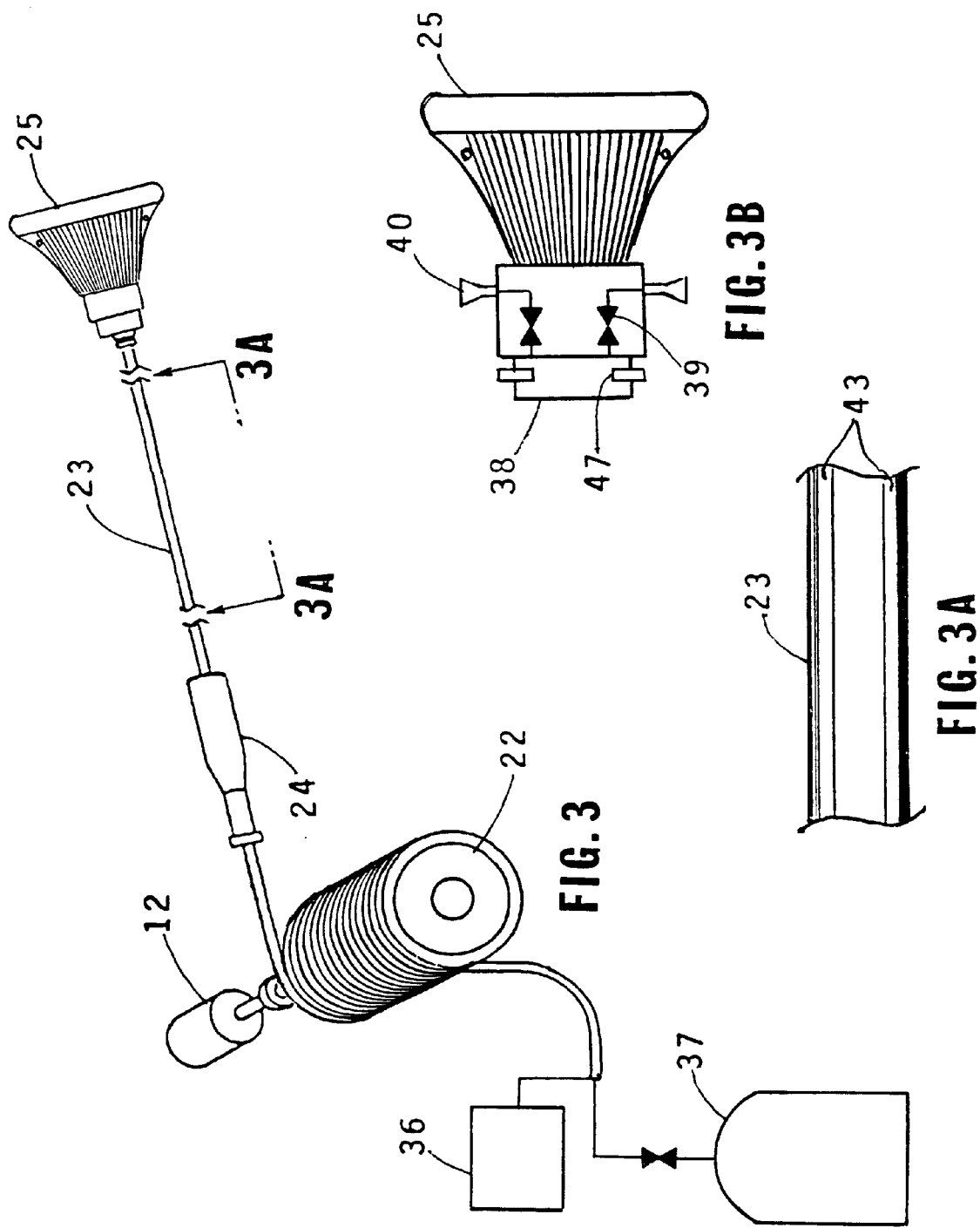
FIG. 3 is a schematic drawing illustrating the use of cold gas for propelling the drogue used in the system of the invention.

The drogue motion control utilizes alternative approaches depending on the size of the unmanned air vehicle being refueled and the refueling speed envelopes. There are two basic alternatives 1. The use of aerodynamic lifting surfaces 42 mounted on the paradrogue base, as shown in FIGS. 4B and 2. The use of controlled radial thrust on the drogue, as shown in FIG. 3.

Referring to FIG. 4B, the aerodynamic lifting surfaces are formed by collapsible lifting surfaces integral with the paradrogue base which comprise fins 42 operated by actuators 41. The actuators may be electromechanical, hydraulic or pneumatic. Pneumatic actuators may be powered by hot or cold gas.

Referring to FIG. 3B, controlled thrust is provided by thrust nozzles 40 mounted on ring headers 47 which are attached to the base assembly 38 of the paradrogue. The thrusters 40 are mounted such that the thrust vectors are radial.

Referring now to FIG. 2B, the thruster ring header 47 is divided into compartments with each compartment forming an inlet header 33 to each thruster individually. In the case of a hot gas system, each header interfaces with a gas generator 34 containing a propellant mixture. A high pressure combustion technique and a down stream filter ensure that no partially combusted particles exit the system. The discharge nozzles 32 ensure that no hot gas escapes the system. The gas generators are initiated by laser energy conveyed through optical fibers 52(See FIG. 4) embedded in the wall of refueling hose 23. At the other end of the hose, the optical fibers are linked to a laser diode array 29(See FIG. 2).

If a cold gas system is used, pressurized gas is expanded through the thrust nozzles 40 mounted on the paradrogue base (see FIG. 3) as with the hot gas system. Gas entry into the nozzles is controlled by a solenoid valve(not shown) upstream of each nozzle. The solenoid valves open on command from the system computer 14.

As best shown in FIG. 2, the system optics consists of laser diode array 29, fiber bundle 26, avalanche photo diode 28, imaging fiber bundle 27 and lenses 44 and 49 with filters(see FIG. 5). All of the electronics and optics except for a single lens are located on the tanker. It is to be noted that the drogue-probe tracking subsystem, the drogue motion control subsystem and the system electronics and optics subsystems of the present invention can also be utilized to advantage in manned tanker operations with existing automatic aerial refueling systems where additional drogue stability and/or automated drogue refueling engagement is desired.

Figure 6:
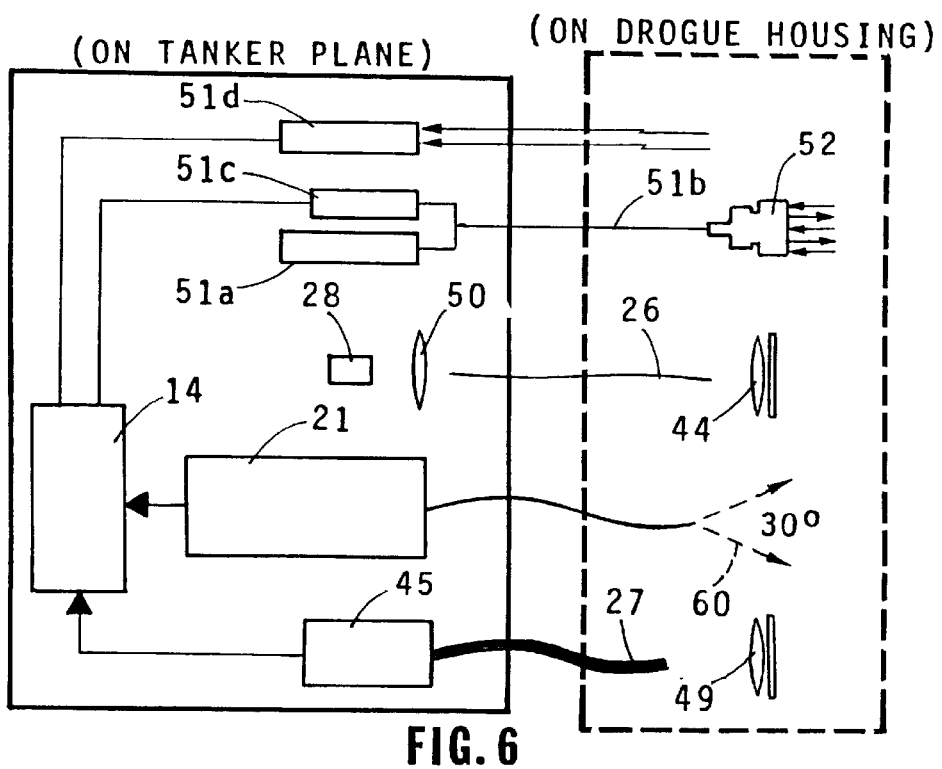
FIG. 6 is a schematic diagram illustrating the tracker assembly employed in the Autonomous Aerial Decontamination System of the invention.
Figure 7:
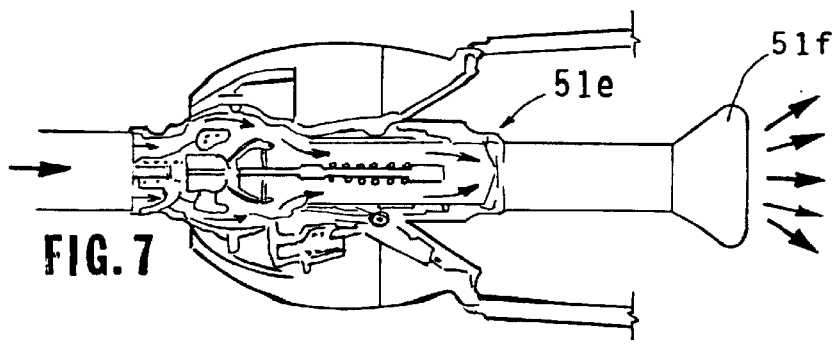
FIG. 7 is an illustration of the spray nozzle emloyed in the Autonomous Aerial Decontamination System.

The system of the invention can also be used as an Autonomous Decontamination System by incorporating modifications as shown in FIG. 6. To make for such utilization, the system tracker must incorporate additional components and the drogue motion controller must be equipped with more powerful side thrusters at the drogue to ensure higher navigational capability than for a system solely employed for refueling. In this system, a contamination sensor is incorporated. For detecting an aircraft surface contaminated by biological agents, the surface in question is illuminated by a laser beam from laser diode 51a. The laser beam is carried by an optical fiber 51b to a collimating lens 52 from where it is directed to the surface of the aircraft to be decontaminated. The interaction of the laser beam with biological microorganisms generates a fluorescence a portion of which is received by collimating lens 52 and conveyed to fluorescence sensor 51c through optical fiber 51b. For the detection of nuclear contamination, a nuclear radiation sensor 51d is employed, the detection process operating in the same manner as just described. FIG. 7 illustrates a spray nozzle which can be employed in spraying the contaminated aircraft with an appropriate decontaminant. This is a conventional nozzle 51e which is interfaced with the drogue 51f.

While the invention has been described and illustrated in detail, this is intended by way of illustration and example only, the scope of the invention being limited by the terms of the following claims.

We claim:

1. An autonomous system for controlling the aerial feeding of a liquid decontaminant to an unmanned aircraft for decontaminating said aircraft having a probe for receiving said liquid from a liquid supply aircraft, said liquid supply aircraft having a drogue for feeding said liquid to said probe comprising:

a hose for feeding said liquid to said drogue, a reel on which said hose is wound, a motor on the liquid supply aircraft for driving said reel, means for generating a laser beam which is fed to the surface of said unmanned aircraft, means for receiving a signal back from said unmanned aircraft surface indicating contamination, a radio transponder on the unmanned aircraft, a radio transponder on the liquid supply aircraft for transmitting signals to and receiving signals from the transponder on the unmanned aircraft, the signals received from the unmanned aircraft indicating the relative positions between the two aircraft, and computer means on the liquid supply aircraft for processing the signals received by the transponder on the fueling aircraft and generating control signals for controlling the positioning of the drogue relative to the probe on the hose reel.

2. The system of claim 1 and further including a motor controller responsive to the control signals generated by said computer means for controlling the reel drive motor to reel in any excess hose.

3. The system of claim 1 and further including a lidar tracker for maintaining line of sight between the drogue and probe, said lidar tracker being connected to said computer for operation in conjunction therewith.

4. The system of claim 1 and further including a spray nozzle for spraying the unmanned aircraft.

5. The system of claim 1 and further including means for controlling the motion of the drogue comprising a plurality of thrust nozzles mounted on the base of the drogue.

6. The system of claim 1 and further including means for controlling the motion of the drogue comprising lifting control surfaces on the drogue.

7. A method for autonomously controlling the aerial feeding of a decontaminant liquid to an unmanned aircraft having a probe for receiving said liquid from a liquid supply aircraft, said liquid supply aircraft having a drogue for feeding liquid to said probe comprising the steps of:

generating a laser beam, feeding said laser beam to the surface of the unmanned aircraft, receiving a signal back from said surface indicating contamination, feeding said liquid to said drogue through a hose, winding said hose on a reel, driving said reel into said drogue, transmitting signals between a radio transponder on said unmanned aircraft and a transponder on said liquid supply aircraft, said signals indicating the relative positions between the two aircraft, and processing the signals received by the liquid supply aircraft and generating control signals for controlling the positioning of the drogue relative to the probe and the hose reel.

8. The method of claim 7 and further including the step of reeling in any excess hose.

* * * * *